United States Patent [19]

Bonaquist

[11] Patent Number: 5,136,281
[45] Date of Patent: Aug. 4, 1992

[54] MONITOR FOR REMOTE ALARM TRANSMISSION

[75] Inventor: James P. Bonaquist, Mt. Clemens, Mich.

[73] Assignee: Electronic Data Systems Corporation, Southfield, Mich.

[21] Appl. No.: 295,487

[22] Filed: Jan. 10, 1989

[51] Int. Cl.$^5$ .............................................. G08B 21/00
[52] U.S. Cl. ................................... 340/644; 340/506; 379/37; 379/42
[58] Field of Search ............... 340/644, 541, 547, 550, 340/551, 552, 561, 563, 565–567, 505, 506; 379/46, 39, 37, 40, 42–44, 47

[56] References Cited

U.S. PATENT DOCUMENTS

| | | | |
|---|---|---|---|
| 3,544,722 | 12/1970 | Hartfield | 340/541 |
| 4,023,139 | 5/1977 | Samburg | 340/541 |
| 4,447,872 | 5/1984 | Nothaft | 379/46 |
| 4,510,350 | 4/1985 | Wagner | 379/46 |
| 4,532,507 | 7/1985 | Edson et al. | 340/541 |
| 4,689,610 | 8/1987 | Dietrich | 340/541 |
| 4,692,750 | 9/1987 | Murakami et al. | 340/514 |
| 4,718,079 | 1/1988 | Rabito | 379/39 |
| 4,748,654 | 5/1988 | Gray | 379/41 |
| 4,808,972 | 2/1989 | Nicholls | 340/541 |
| 4,872,195 | 10/1989 | Leonard | 379/40 |
| 4,907,079 | 3/1990 | Turner et al. | 379/92 |
| 4,956,637 | 9/1990 | Vogt | 340/644 |

FOREIGN PATENT DOCUMENTS

2584217 1/1987 France ............................. 340/541

*Primary Examiner*—Edward L. Coles, Sr.
*Assistant Examiner*—Jill Jackson
*Attorney, Agent, or Firm*—Brooks & Kushman

[57] ABSTRACT

A remote monitoring apparatus comprises a computer program controlled monitor for detecting changes in condition responsive relay switches to generate a data signal identifying the change of switch condition, a report assembler which prepares a report in a preselected format identifying the apparatus location and including the data signal generated, and a modem for automatically transmitting the assembled report to a selected number of remote locations connected with the monitoring site by a telecommunication network. The monitoring apparatus repeatedly accesses the telecommunication network until a successful communication has been transmitted to each remote location. The apparatus also senses the loss of a continuous, primary power source and includes a back-up power supply. The program limits the number of unsuccessful attempts which can be made with the back-up power supply and preserves the assembled reports for later transmission when power has been fully restored. In addition, the remote locations to be contacted can be changed as desired, the format of the reports can be adjusted and the normal and alarm conditions of the relay switches can be adjusted as desired to increase the versatility of the monitoring device.

11 Claims, 8 Drawing Sheets

MONITOR FOR REMOTE ALARM TRANSMISSION

BACKGROUND OF THE INVENTION

I. Field of the Present Invention

The present invention relates generally to apparatus for monitoring the condition of relay switches and more particularly to such an apparatus constructed to automatically transmit a communication signal identifying the change in condition to a remote location through a telecommunication network whenever such a change occurs.

II. Description of the Prior Art

There are many known types of alarm systems. However, previously known alarm systems are often particularly configured for use within a particular environment. As a result, alarm systems used for security purposes often differ substantially from alarm systems used in quality control operations. In particular, the sensors utilized to detect the condition upon which an alarm output must be generated are particularly configured for use with a predetermined environmental structure or a particular function, and thus cannot be employed in other environments Moreover, the previously known alarm systems often generate alarm output at a location in close proximity to the location at which the condition being sensed occurs. If the alarm output must be provided to a location remote from the location of the condition being sensed, the alarm system typically includes a transmission or communication path between the alarm output and the detector. As a result, expanding the distance between these locations requires the incorporation of a transmission circuit within the alarm system itself, thus substantially increasing the cost and complexity of the alarm system. Moreover, while an installation having dedicated transmission lines may be adequate for communication within a single room or building, it is impractical to employ a dedicated transmission system when the two locations are separated by great distances.

Although telecommunication networks have been established to communicate information over great distances, access to such systems is typically initiated by human operators. In particular, the operator must monitor the initiation of access to a carrier by dialing or instructing an automatic dialer to begin a communication attempt. The operator must also monitor whether a connection with a carrier has been made at the other end or whether a busy signal or other inability to communicate with the remote location prevents transmission of the desired information. If the attempt was frustrated by the inability to obtain a carrier connection with the receiving location, the operator will determine that a second attempt is necessary and reinitiate the communication at a later time. As a result, these previously known alarm systems are not well adapted for use as unattended monitors for alarm conditions arising at one location which must be communicated to a remote location. Therefore, these previously known alarm systems have limited interfacing capacity with telecommunication networks Although some previously known security systems automatically signal an alarm condition over a telecommunication network, such systems cannot be easily modified to change reported data, accept additional conditions, modify alarm conditions, and change the remote locations to which reports are sent.

SUMMARY OF THE PRESENT INVENTION

The present invention overcomes the above mentioned disadvantages by providing a relay monitor adapted to monitor a wide range of conditions and assure that a report of any changed condition is timely conveyed to at least one remote location linked only by a telecommunication network with the location or site of the alarm condition. In general, the apparatus senses the condition of generic inputs, assembles a report describing and identifying the changed condition and transmits the information through a telecommunication network. Moreover, the data to be transmitted is protected against loss due to an inability to complete the transmission of the data or a loss of a primary power source affecting operation of the relay monitor device.

In the preferred embodiment, the apparatus functions as an unattended relay monitor continually supervising up to sixteen normally open or closed relays. Upon detecting a change of state in any of the monitored relays, the device sends up to two assembled reports indicating the new status, the identification of the relay whose status has changed, the site location at which the alarm originated and the time and date of the condition change. A non-volatile memory retains information identifying the monitored points, the telephone numbers to be dialed, the device identification information, the restored condition of the monitored relays a predetermined condition of the relays and the time and date. The non-volatile memory can be accessed locally by a console through a serial port and access may be limited by password requirements and time entry. In addition, the monitor is responsive to a console located at a remote location which can be used to change the stored data by coupling the modem to receive data over a telecommunication network from a remote terminal location.

The relay monitor also includes transmission means including the modem. The transmission means repeatedly accesses a telecommunication network to convey the assembled reports to the remote location. In the preferred embodiment, the relay monitor can deliver messages in two formats and to two different remote locations. In the event that a carrier cannot be connected in the telecommunication network, the transmission means repeatedly attempts to obtain access to the remote location through the telecommunication network. In the preferred embodiment, the transmission means also includes delay means for temporarily terminating access attempts for a predetermined time after a predetermined number of consecutive access attempts have failed. Nevertheless, the transmission means reinitiates repeated attempts to access the remote location through the telecommunication network when a further condition change is sensed or when the delay period has lapsed. As a result, the present invention avoids the need for human intervention in communicating the change of condition to a remote location accessible only by a telecommunication network.

The report assembly means includes means for generating a cumulative communication of each switch condition change occurring since the last communication transmission. In addition, the present invention further avoids the need for human intervention by monitoring its own operation. In the event that the power supply to the monitor is interrupted, a back-up supply is switched on. In addition, means for monitoring the switches generates a data signal delivered to a report assembling means for generating a communication reporting the loss of power. With the back-up power supply switched on, the transmission means accesses the telecommunication network to transmit the power loss communication to the remote locations. However, the transmission means also includes stop means for terminating attempts to access the telecommunication network after a predetermined number of attempts have been made. The unit then stores the communications assembled until primary source power is restored for a predetermined time. When the primary power source is restored, the generated communications are again transmitted to the remote locations along with a report that the power is on and the time of the power return.

As a result, the present invention provides an automatic relay monitoring device which is adapted to detect an alarm condition in generic inputs and report the information over a telecommunication network to a remote location without human intervention. Moreover, the apparatus is self-monitoring so as to determine whether it is functioning properly internally and with an adequate power supply. In addition, the apparatus is versatile and can be adapted to change the format of the communications transmitted, the remote locations to which the communication is transmitted and the status of conditions which are considered restored or alarm conditions. These instructions can be accepted by the monitor regardless of whether they are generated at the local site or a remote location. These and other advantages of the present invention will be more clearly understood from the following detailed description of a preferred embodiment.

BRIEF DESCRIPTION OF THE DRAWING the present invention will be more clearly understood by reference to the following detailed description of the preferred embodiment when read in conjunction with the accompanying drawing in which like reference characters refer to like parts throughout the views and in which.

DETAILED DESCRIPTION OF THE PREFERRED EMBODIMENT

Figure 1:
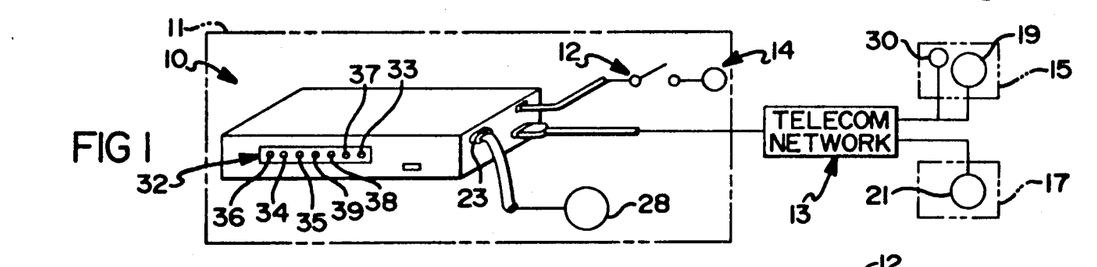
FIG. 1 is a perspective view of a relay monitor constructed in accordance with the present invention and diagrammatically coupled with additional system components.

Referring first to FIG. 1, the preferred embodiment of a remote monitoring apparatus 10 is shown in a diagrammatic system connecting a local site 11 through a telecommunication network 13 to remote locations 15 and 17. Generally, the apparatus 10 is coupled to a plurality of relay switches 12 (one shown) responsive to operating conditions of the monitored working apparatus 14. For the purpose of illustration and without limiting the scope of the present invention, it may be understood that the apparatus 14 can be of any type which has normal operating conditions represented by normally open or normally closed relay switches 12. The opening of the normally closed switch, or the closing of the normally open switch 12, is then sensed by the relay monitor device 10. For example, the relay switch 12 may operate in response to movement of a door.

The apparatus 10 has an internal modem to access the telecommunication network 13 which provides a link to remote locations 15 and 17. Equipment 19 and 21 adapted to record or display the alarm message communicated by the remote monitor 10 is coupled to the telecommunication network 13 at each remote location 15 and 17. A serial port connector 23 is shown in FIG. 1 connected to a console 28 for entering data locally into a non-volatile memory in the remote monitor 10 in a manner to be discussed in greater detail hereinafter. As indicated diagrammatically at 30 in FIG. 1, a remote console can also be coupled by a modem to the telecommunication network 13 to access the non-volatile memory from a remote location, such as a remote host station 15.

Figure 2:
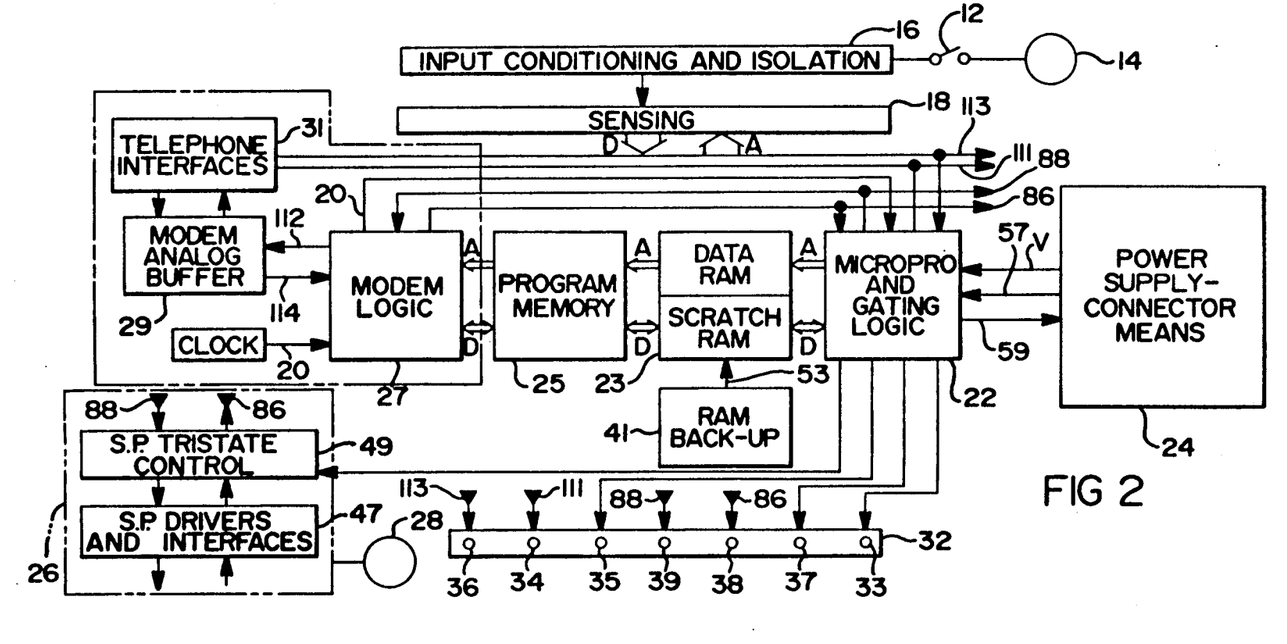
FIG. 2 is a block diagram of the relay monitor constructed in accordance with the present invention.

As shown in FIG. 2, the remote monitoring apparatus 10 includes relay monitoring means including input conditioning and isolation circuitry 16 for sensing a change in condition of any of sixteen relay switches 12 and generating a data signal in the form of logic data having reduced voltage and current but corresponding to the change in condition. For example, opening and closing of the relay generates high and low signals which can be used as logic entries in an input sensing logic circuit 18 made of two 74LS244 integrated circuits. A microprocessor and gating logic integrated circuit 22 such as an 8052AH handles the logic entries in accordance with the program in memory 25, and together with data stored in the data and scratch ram integrated circuit 23 provides a report assembling means for generating a communication. The communication assembled describes the condition change, identifies the relay affected by the change, identifies the location of apparatus 10 coupled to the monitored apparatus 14 and indicates the time and date at which the condition change occurred. In addition, the remote monitor apparatus 10 includes computer-controlled transmission means including modem logic 27, a modem analog buffer 29 and a telephone interface 31, for transmitting the communication to the remote locations 15 and 17 from the location or site 11 of the apparatus 10 and the operating device 14.

The monitoring means, the assembling means and the transmission means are controlled by a computer program to be described in greater detail hereinafter. Preferably, integrated circuits coupled by data and address links are used although discrete components could be employed under desirable conditions. In the preferred embodiment, the logic circuit employs a K212L integrated circuit for the modem logic 27, a D27128A integrated circuit for program memory 25 and a CDM6264 for the data and scratch ram integrated circuit 23, while two 74LS244 integrated circuits make up the 16 point input sense circuit 18. The microprocessor integrated circuit is combined with an address latch i.c. such as a 74LS373 and an address decoder integrated circuit such as a 74LS138 as the gating logic. Operation of these components in the apparatus 10 is coordinated by a system clock 20 and powered by a power supply connection means 24 adapted to be connected to a conventional AC power supply and also containing a rechargeable battery back-up In addition, the data and scratch ram 23 is made non-volatile by a ram back-up supply 41. An indicator 32 including LED's provides visible indications of operating conditions of the remote monitoring device 10 at the location of the device as will be described.

As also shown in FIGS. 1 and 2, information which identifies the monitored points or relays 12, the phone numbers to be dialed, device 10 identification information, the reference condition such as the restored condition of the monitored relays and the time and date can be entered or changed in the non-volatile memory 23 by local or remote means. A serial port control means 26, including a serial port tristate control 49 with a 74LS368 integrated circuit and the serial port drivers and interface circuit 47, can be coupled to the local console 28 at the site 11 of the relay monitor 10. Alternatively, a terminal at a remote location can be coupled to the telecommunication network 13 by a dial-up modem, such as a Bell 212A compatible at 1200 baud, as indicated diagrammatically at 30 in FIG. 1. In addition, the monitor 10 is responsive to and can communicate in machine language or human readable language as will be described in greater detail hereinafter.

Figure 3:
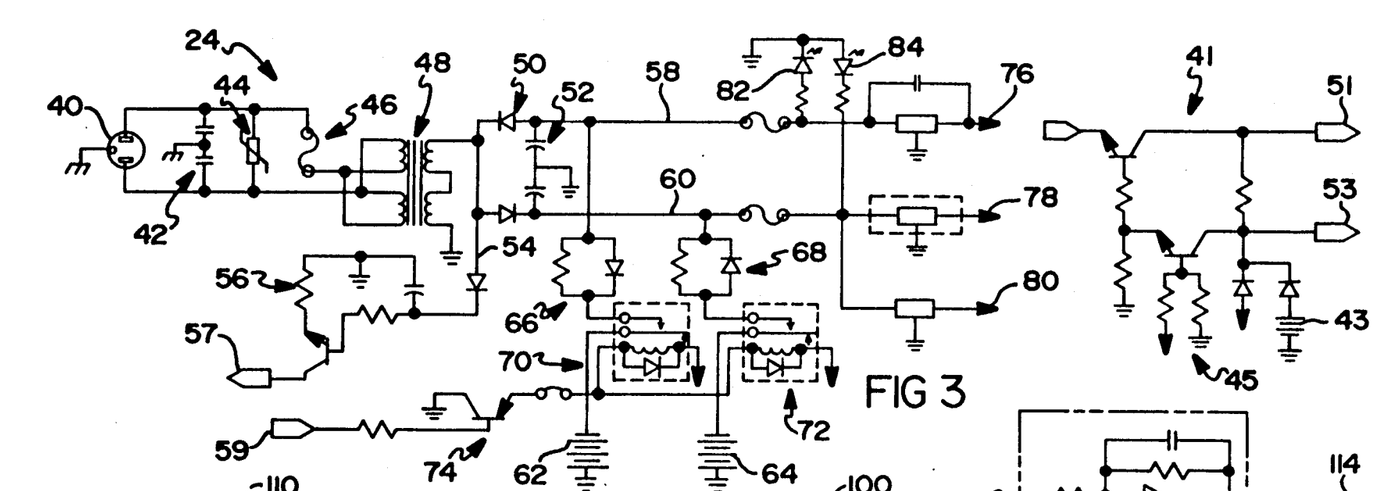
FIG. 3 is a schematic diagram of power supply portions of the circuit for the relay monitor shown in FIG. 1.

As best showon in FIG. 3, the power supply connector means 24 receives an AC power supply input from a conventional source such as a wall plug 40. Noise reduction capacitors 42 and a voltage spike protector 44 are coupled through a fuse 46 to a transformer 48. The transformer 48 reduces the voltage before delivering it to the rectifier diodes 50 and the filtering capacitors 52. The output from the secondary winding of the transformer is sampled through a line 54 to an AC sensing circuit 56 providing a gating logic input 57 to the computer logic circuit.

The rectified and filtered output from the transformer 48 is delivered through lines 58 and 60 to provide negative and positive DC voltage for output from the power supply connector 24. In addition, each of the lines 58 and 60 is coupled to rechargeable batteries 62 and 64 respectively, through battery charge circuits 66 and 68 respectively and isolation relays 70 and 72. The isolation relays 70 and 72 are operated in response to logic relay signal applied at 59 through transistor switch 74 from the logic circuit in response to sensing of an AC power loss as will be described in greater detail hereinafter. In any event, the lines 58 and 60 are coupled through fuses to output taps 76, 78 and 80 to provide operating voltages of +5VDC, +12VDC and −12VDC, respectively, for the logic circuit. These voltages are diagrammatically indicated at V in FIG. 2.

Light emitting diodes 82 and 84 provide visible indications that negative and positive voltages are being generated from the power connector circuit 24.

FIG. 3 also shows the data preserving power supply 41 rendering the ram 23 non-volatile. The battery 43 provides sufficient voltage 53 to the ram 23 whenever the sensor switch 45 detects that the power connector circuit fails to provide an adequate voltage, and a chip disenabling signal 51 is provided to prevent excess power draws from the ram battery 43.

Figure 4:
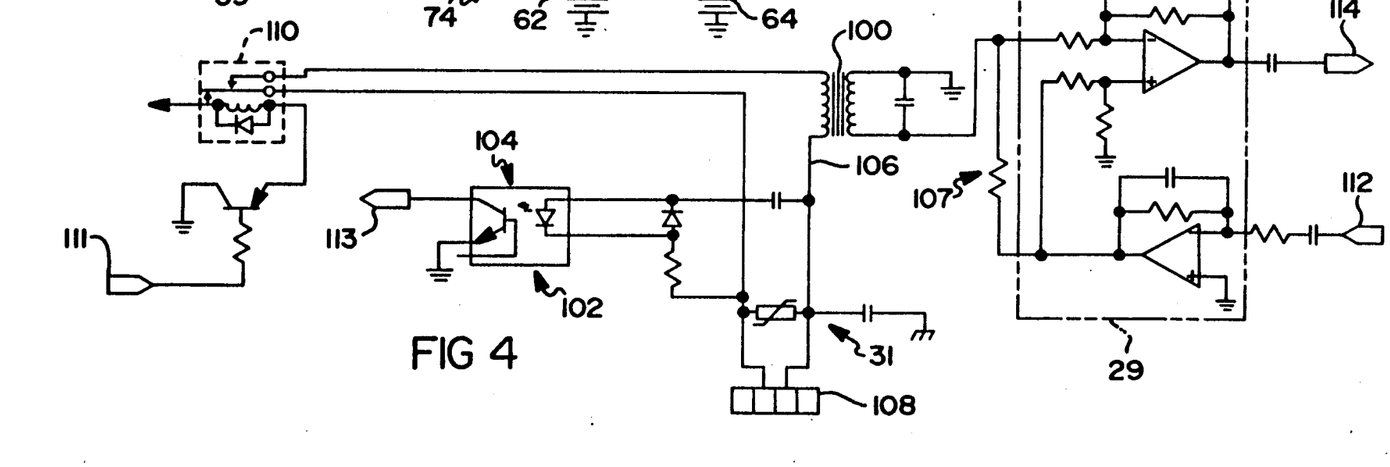
FIG. 4 is a schematic diagram of the interface for connecting a telecommunication network line to the modem in the relay monitor of FIG. 1.

Referring now to FIG. 4, the interface between the modem logic 27 and a telecommunication network line of the network 13 includes an isolation transformer 100. The transformer 100 couples the line connecting circuit 106 of the interface 31 to the logic connecting circuit 107 of the interface 31. The line connecting side of the interface 31 also includes a ring detect circuit 102 for providing an indication 113 of a ring signal to the logic circuit of the remote monitor 10. The ring detect circuit 102 includes an optoisolator 104 for generating a signal responsive to detection of a ring signal through the communication line of the telecommunication network 13 coupled to the monitor 10 through the terminal 108. The circuit 106 also includes a switch 110 coupled in series with the primary winding of the isolation transformer 100. Switch 110 is responsive to a logic signal 111 generated by the logic circuit. The secondary winding of the isolation transformer 100 is coupled to receive a communication signal from the logic circuit through a line 112, and to transmit communication signals from the telephone line through line 114 through the buffer arrangement 29.

Figure 5:
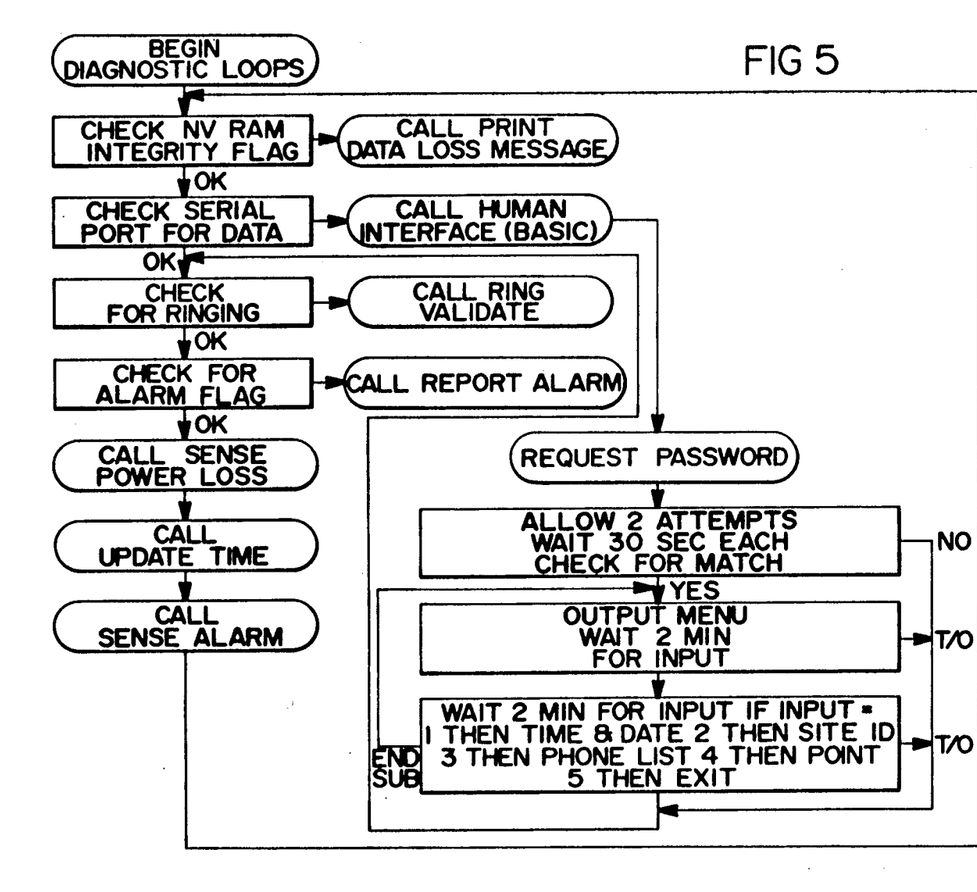
FIG. 5 is a block diagram of the operating cycle for a computer program employed in the relay monitor shown in FIG. 1 and including an instruction receiving portion of the program.

When the remote monitor apparatus 10 is turned on by connection to an AC power source, the apparatus proceeds with a diagnostic analysis of selected system components as shown in FIG. 5. The diagnostic subroutine sequentially checks the scratch ram portion of integrated circuit 23 by comparing its size with the size determined during diagnostic operation of the microprocessor 22, sizes and tests the stored data portion of the non-volatile ram, checks the integrity of the data stored in the non-volatile ram, performs a check sum on the program memory to determine that the program is still intact and checks the modem for proper operation. If a component is not operating properly, an error flag is set, and so long as any flag remains, except a non-volatile ram integrity flag indicating a loss of stored data, the unit 10 remains cycling in the diagnostic routine and the error lamp 33 of the indicator 32 continues to flash. When an error in the integrity of the non-volatile ram occurs, a subroutine clears the non-volatile ram and initializes the ram to a default condition which restores at least a minimum of data for assembling and reporting the existence of an alarm condition to a remote location. In particular, at least one remote location phone number and default alarm conditions are loaded into memory so that a remote location can be contacted by the monitor apparatus 10.

Once the diagnostic tests have been performed, and no error flags other than a non-volatile ram integrity flag remain, the main loop of the program shown in FIG. 5, is entered for continuous monitoring of the relays coupled to the apparatus 10 as well as selfmonitoring of the functions of the apparatus 10. As shown in FIG. 5, the program sequentially checks for data at the serial port, communications through the phone line and alarm flags generated by the sense alarm subroutine in response to detection of a relay condition change. An additional monitoring function includes the monitoring of the power supply.

When an error flag has been generated by the detection of an error in the integrity of the non-volatile ram of integrated circuit 23, a report assembler means generates a communication reporting that data has been lost. Data can then be provided to the ram through the serial port by means of the local console 28 or through the interface 31 from the remote console and modem unit 30. Each of these communication modes is described in greater detail with reference to FIGS. 5 and 10, respectively.

As shown in FIG. 5 at the basic subroutine for human interface in the preferred embodiment, access is limited by permitting two attempts to enter a password in response to a request for a password to be inserted within 30 seconds and providing two minutes to key in data once the proper password has been selected. The data to be keyed in includes the time and date, site or location identification of the remote relay monitor, the phone numbers to be dialed by the modem, and the relay switch identification data. After all of these data have been entered, the subroutine ends and the program returns to the main loop. When data is being received by the monitor 10, as indicated diagrammatically at signal path 86 in FIG. 2, the lamp 38 of indicator 32 is lit.

Figure 10:
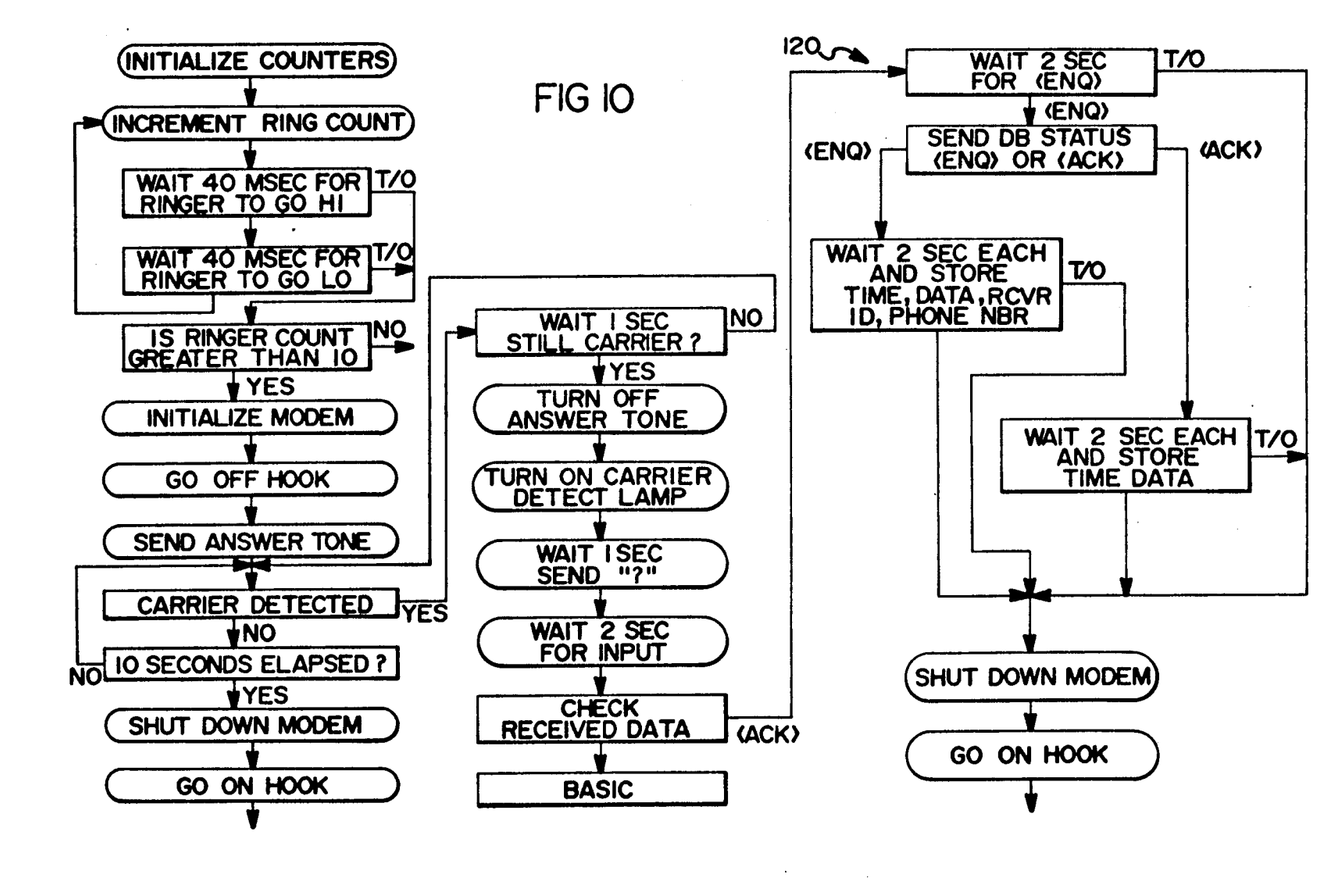
FIG. 10 is a block diagram of a transmission receiving portion of the computer program shown in FIG. 5.

The system then determines whether a ring signal has been detected in the ring detector 102. The logic is not merely stimulus responsive, but also checks whether the signal is cyclic and intermittent to distinguish foreign signals from ring type signals. A visible indication of a detected ring is provided by lamp 36 of indicator 32. When a ring signal is verified by recognition of intermittent high and low signal conditions as shown in FIG. 10, an off hook signal is generated to complete the line circuit 106 and the modem logic 27 generates an answer tone. The off hook condition is represented by a signal which illuminates the display lamp 34 on indicator 32. If a carrier is . detected after a duration of 1 second, the answer tone is turned off, the carrier detect lamp 35 is turned on while a prompt is sent through the telecommunication network line. The serial port service subroutine then determines whether the communication is being transmitted through a computerized controller or a human generated keyboard input by the signals sensed and the time in which they are transmitted. If the data is not sent to the basic subroutine shown in FIG. 5, it is automatically sorted and stored as shown at 120 in FIG. 10. After the data is received and stored in the appropriate format, the modem then shuts down and the line interface circuit 106 is interrupted by an on-hook, signal condition.

Figure 11:
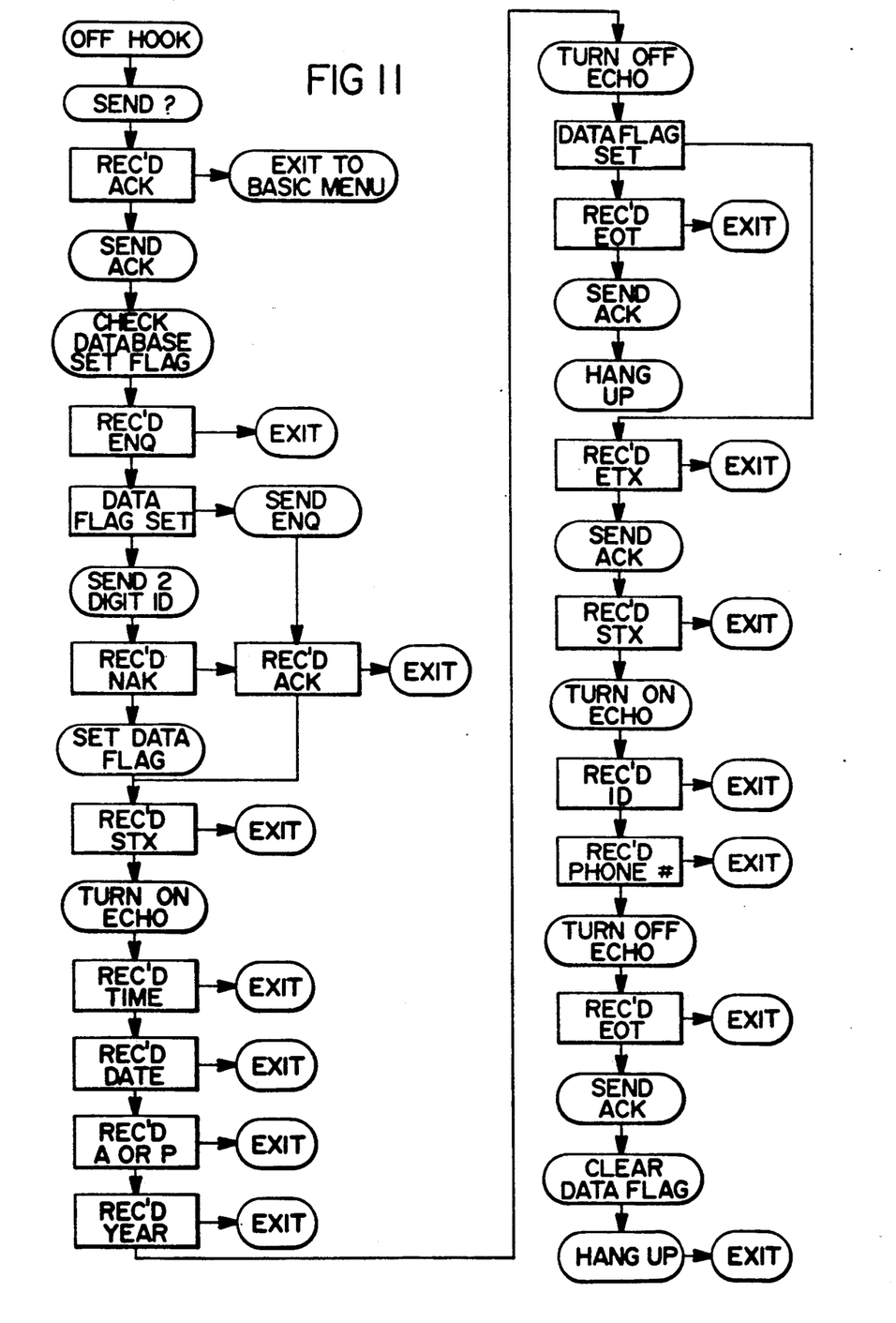
FIG. 11 is a block diagram of an automatic transmission control program operable with the computer program shown in FIG. 5.

An example of computer controlled communication is shown in FIG. 11. In this example, the apparatus 10 communicates with a host computer to synchronize its time with a system time and receive all necessary data to send a complete report to the proper remote locations. The system assures that the identification of the apparatus 10 is correct and echoes any received data to assure that it has been properly received. Whenever data is being received, the indicator lamp 38 is illuminated.

Figure 6:
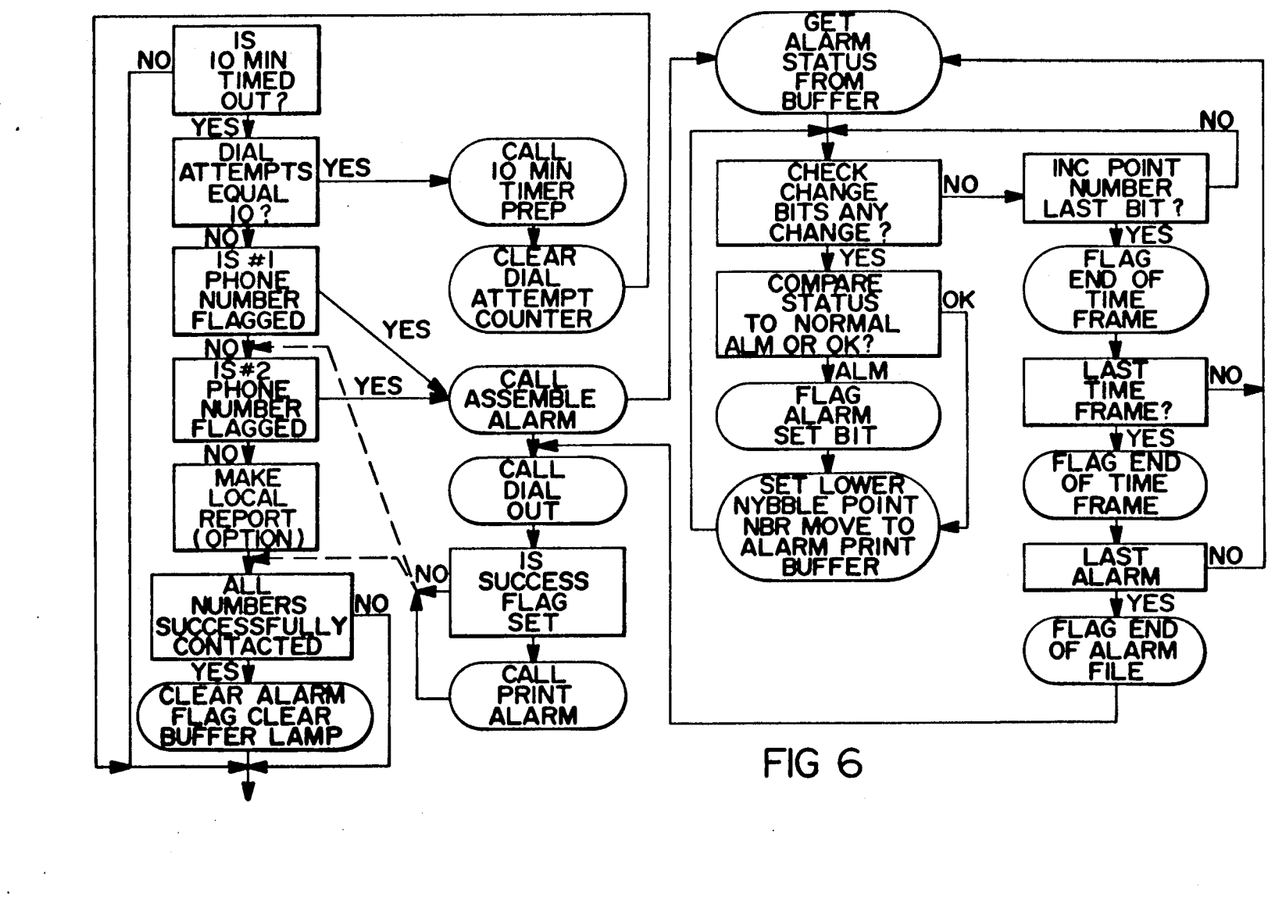
FIG. 6 is a block diagram of an alarm reporting portion of the computer program shown in FIG. 5 and including an alarm assembly subroutine.

After external communications are completed, the program checks for alarm flags responsive to relay conditions. When an alarm flag is detected, a report alarm subroutine shown in FIG. 6 determines whether a 10 minute time delay has been timed out and whether the number of dial attempts made is less than 10. As long as a phone call has not yet been made to a flagged number, an alarm status is delivered from the buffer and compared to see whether any change in status in the relay conditions has occurred in a report assembly subroutine shown in FIG. 6. Moreover, comparison with the data in non-volatile memory of integrated circuit 23 determines whether the status is a restored or an alarm condition. An alarm flag is generated when the condition is a changed condition according to the data last retained in the non-volatile memory buffer. When the alarm status from the buffer no longer changes, the assembled alarm report is available for transmission through the telecommunication network 13, and a dial out sequence commences.

Figure 7:
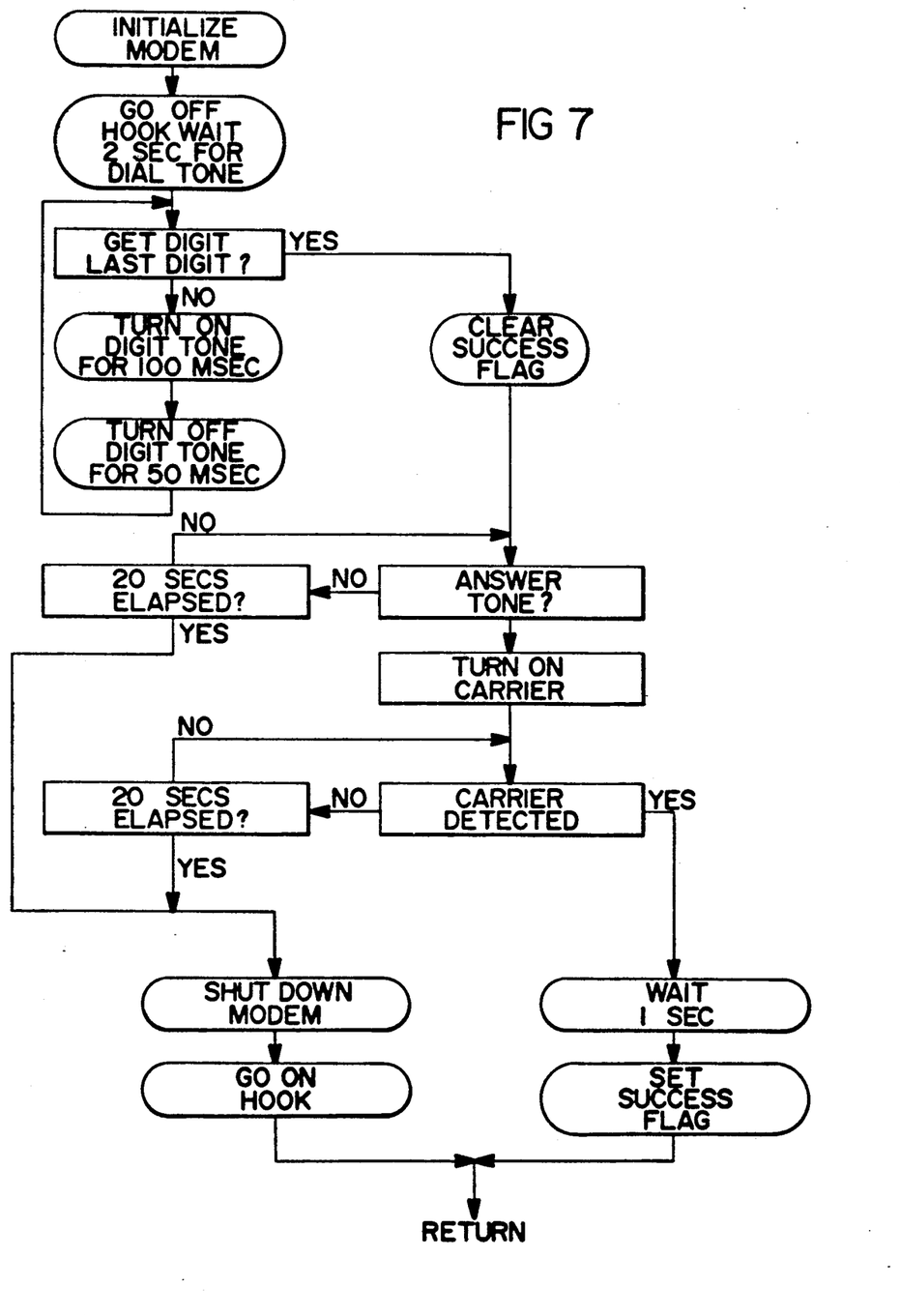
FIG. 7 is a block diagram of a transmission control portion of the computer program shown in FIG. 6.

Referring now to FIG. 7, when the report has been assembled, the modem 27 goes off hook and waits two seconds for a dial tone. A success flag is then cleared after all of the data has been accumulated and the path of a first flagged phone number for location 15 is opened. If a carrier is detected within 20 seconds, the information is conveyed to the telecommunication network line by a print alarm subroutine. The transmission of data, as diagrammatically indicated by signal path 88 in FIG. 2, is indicated by illumination of the data transmission lamp 39. Once the information has been conveyed and the success flag is set after a one second time delay, a path is then opened for the second flagged phone number for location 17. In the event that no carrier is detected within 20 seconds for the location of the first flagged phone number, a path for the second flagged phone number is opened so that the alarm can be reported at the second remote location 17. If the report to the second location 17 cannot be completed within the next 20 seconds through a carrier, the modem is shut down and a subsequent dial-out sequence is repeated. After ten unsuccessful attempts to convey the alarm report to each of the remote locations, a ten minute time delay is imposed before further access attempts are conducted by the monitor apparatus 10. Nevertheless, if a new condition change occurs, the report assembly and transmission processes are reinitiated.

Figure 8:
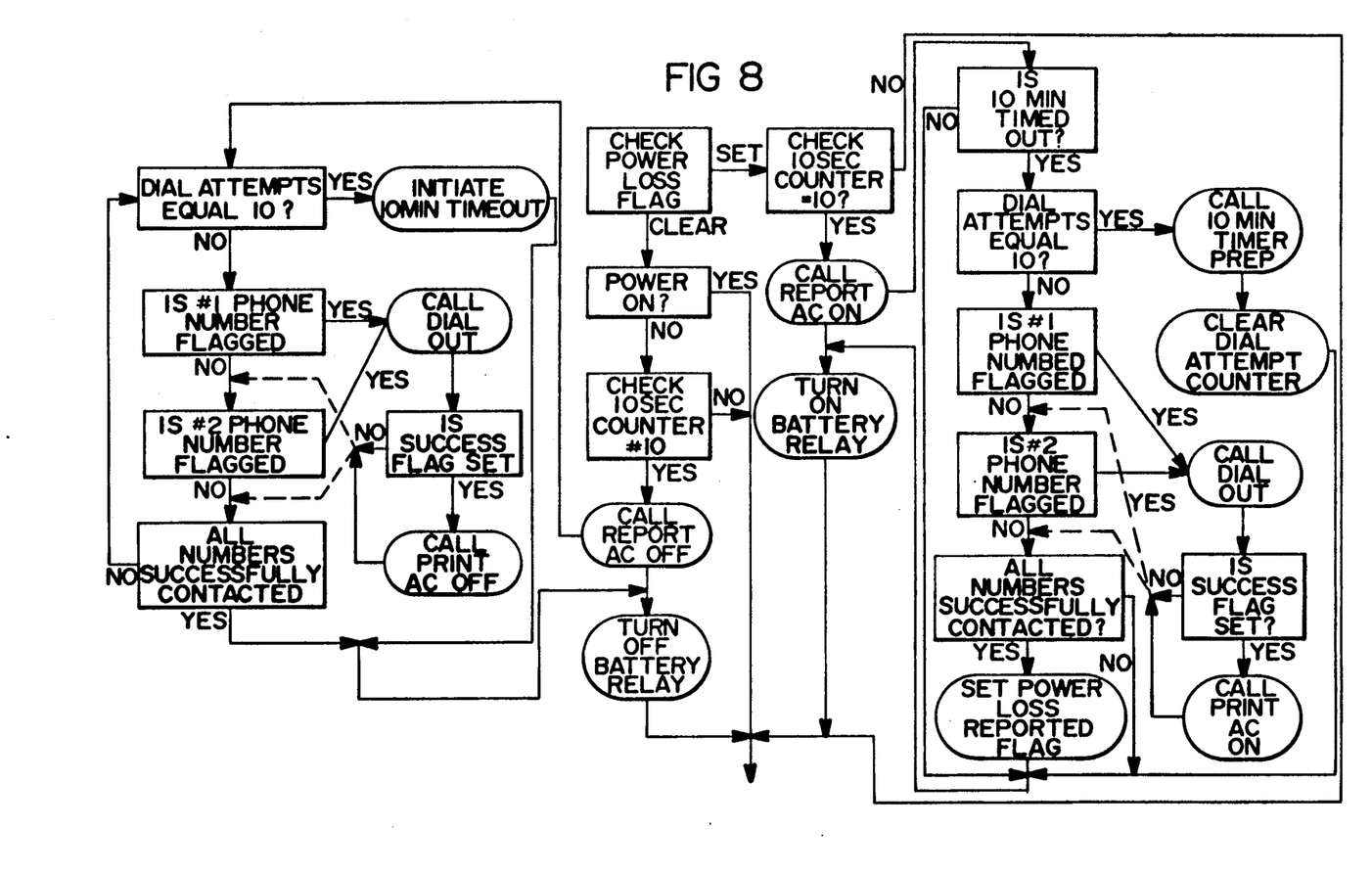
FIG. 8 is a block diagram of power loss detect and report portions of the computer program shown in FIG. 5.

Referring now to FIG. 8, a loss of AC power to the monitor apparatus 10 will also be reported. If the power remains off for more than 10 seconds, a dial attempt is made through the path for the first phone number flagged by a dial out and call sequence such as that previously discussed for other alarm signals. However, when ten attempts have been made to dial out from the remote monitor apparatus 10, the remote monitoring device 10 is shut down. Thus, only the backup power supply 41 for the ram 23 maintains the stored data, and the remainder of the circuit is deactivated.

As also shown in FIG. 8, a report is also generated and reported to the remote locations 15 and 17 when AC power has returned for more than 10 seconds. If the apparatus had previously been shut off from the battery back-up power supply 70,72, a power-on report is sent for transmission through the telecommunication network line. The difference between actual time and the system time reported in the transmission will represent the amount of time the monitor was shut down and without power.

Figure 9:
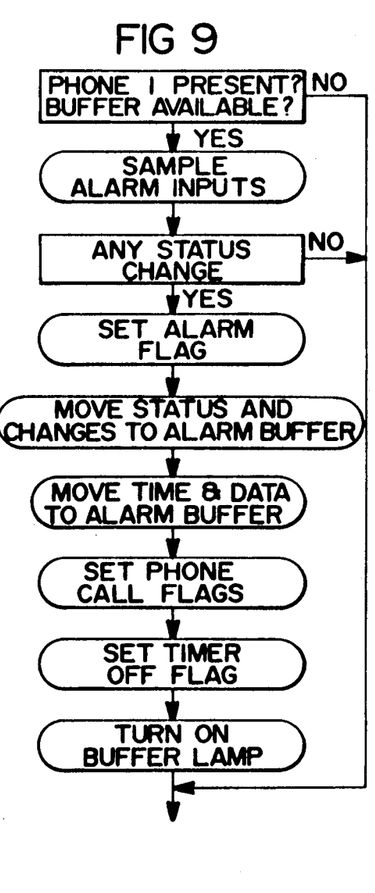
FIG. 9 is a block diagram of a sensor portion of the computer program shown in FIG. 5.

The final subroutine in the main program loop is shown in FIG. 9. Whenever a relay condition alarm is sensed while the apparatus is fully powered by the power connector circuit 24, an alarm flag is set and any previous condition alarm signals and status changes are moved to the alarm buffer. As shown in FIG. 9, the time and date are also moved to the alarm buffer, the phone call flags are set and the buffer lamp 37 of indicator 32 is turned on.

In the preferred embodiment, the last or sixteenth relay 12 is used as a maintenance-on-site indicator. Its restored condition, for example "open", may be used to indicate that the apparatus 10 is continually responsive to actual conditions of the machine 14. If a technician has appeared at the local site 11 in response to an alarm condition elsewhere in the machine 14, he may switch the sixteenth relay to its alarm, for example "closed", position. Thus, any reports of alarms generated while the sixteenth relay is in alarm will continue to show that the technician is on site and that no further response need be made at the remote locations to which reports are sent.

Furthermore, in the event that the technician fails to reset the sixteenth relay to its restored position, he need not return to the local site 11 to receive the alarm condition. Rather, the terminal 28 at the local site 11 or the terminal at 30 at a remote site can be used to revise the data in the non-volatile ram. In particular, the alarm condition can be revised so that the "open" position represents an alarm condition.

Thus, the present invention provides a remote monitoring apparatus 10 for local relay switches which can be left unattended by human interaction. The apparatus reports not only condition changes of the relay switches but also data loss in the non-volatile ram and also the loss of a primary power source to the remote monitoring apparatus 10. Moreover, when attempts to access the telecommunication network are unsuccessful, the apparatus automatically and periodically repeats attempts to report the alarms to the two remote locations connected with the local site through a telecommunication network.

In addition, it may be appreciated that the present apparatus provides substantial versatility by enabling the stored data to be changed from local as well as remote locations by authorized personnel. In particular, a limited access to the non-volatile memory enables the restored and alarm conditions of the relay switches to be adjusted as desired by authorized personnel only. In addition, the phone numbers and thus the remote locations contacted by the apparatus can be varied, and the format of the information to be conveyed to each of the stations can be adjusted. As a result, the present invention is substantially more useful than previously known remote alarm systems in a wide variety of applications.

Having thus described the present invention, many modifications thereto will become apparent to those skilled in the art to which it pertains without departing from the scope and spirit of the present invention as defined in the appended claims.

What is claimed is:

1. An automatic microprocessor controlled remote monitoring device comprising:
a plurality of switches,
monitoring means for comparing a predetermined condition of each switch with the actual condition of each of the plurality of switches and generating a data signal responsive to each change of condition of any said switch;
non-volatile memory means for maintaining control data including an identification of the switch changed, the identification of the location of the monitoring device, condition data for each of said switches, and said predetermined condition of each switch;
report assembly means for generating a communication reporting each said data signal and said control data related to said changed switch condition,
transmission means for automatically accessing a telecommunication system and transmitting said communication to a predetermined at least one remote location upon detecting a modem carrier connection with each of said predetermined at least one remote location,
wherein said transmission means includes means for repeatedly reaccessing said telecommunication system until transmission to all predetermined locations has been completed when no carrier connection is detected with any of said predetermined at least one remote location,
wherein said monitoring means includes means for sampling the switch conditions after each accessing attempts, and 'wherein said report assembly means includes means for generating a cumulative communications of each switch condition change occurring since the last communication transmission.

2. An automatic microprocessor controlled remote monitoring device comprising:
a plurality of switches,
monitoring means for comparing a predetermined normal condition of each switch with the actual condition of each of the plurality of switches and generating a data signal responsive to each change of condition of any said switch;
non-volatile memory means for maintaining control data including an identification of the switch changed, the identification of the location of the monitoring device, condition data for each of said switches, and said predetermined condition of said switch;
report assembly means for generating a communication reporting each said data signal and said control data related to said changed switch condition,
transmission means for automatically accessing a telecommunication system and transmitting said communication to a predetermined at least one remote location upon detecting a modem carrier connection with each said predetermined at least one remote location,
further comprising means for programming said non-volatile memory, and
wherein said means for programming comprises a means for communicating with said memory from a remote location through the telecommunication system.

3. A method for indicating an alarm condition in any of a plurality of relay switches at an originating site to a remote location coupled to teh originating site by a telecommunication network, the method comprising:
monitoring said switches for a change of condition;
storing stored data including an alarm condition for each said switch,
comparing the changed condition of any said switch with a predetermined condition of said switch;
generating a data signal responsive to said change of condition;
assembling a report including said data signal and selecting stored data selected in response to said data signal;

automatically accessing the telecommunication network;

transmitting the assembled report to said remote location upon detecting a modem carrier connection with said remote location; and further comprising sensing an error in the integrity of said stored data, and reprogramming said stored data into memory in response to said error.

4. A method for indicating an alarm condition in any of a plurality of relay switches at an originating site to a remote location coupled to the originating site by a telecommunication network, the method comprising:

monitoring said switches for a change of condition;

storing stored data in memory including a reference condition for each said switch and a predetermined condition for each switch, comparing the changed condition of any said switch with a predetermined condition of said switch;

generating a data signal responsive to said change of condition;

assembling a report including said data signal and selected stored data selected in response to said data signal;

automatically accessing the telecommunication network;

transmitting the assembled report to said remote location upon detecting a carrier connection with said remote location; and sensing an error in the integrity of said stored data, and reprogramming said stored data in memory in response to said error.

5. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for maintaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to a predetermined at least one remote location upon detecting a modem carrier connection with each of said predetermined at least one remote location;

said transmission means includes means for repeatedly reaccessing said telecommunication system when no carrier connection is detected with any of said predetermined at least one remote location; and said monitoring means includes means for sampling the switch conditions after each accessing attempt.

6. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for manitaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to a predetermined at least one remote location upon detecting a modem carrier connection with each of said predetermined at least one remote location;

said transmission means includes means for repeatedly reaccessing said telecommunication system when no carrier connection is detected with any of said predetermined at least one remote location;

said monitoring means includes means for sampling the switch conditions after each accessing attempt; and said report assembly means includes means for generating a cumulative communication of each switch condition change occurring since the last communication transmission.

7. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for maintaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to a predetermined at least one remote location upon detecting a modem carrier connection with each of said predetermined at least one remote location;

said relay monitor further comprises:

a primary power source connector, a back-up power supply;

switching means for switching on said back-up power supply when power is inadequate at said primary source connector, and means for monitoring said switching means to generate a second data signal when said back-up power supply is activated;

wherein said report assembly means includes means for generating a power loww communication in response to said second data signal and wherein said transmission means transmits said power loss communication to said at least one remote location upon detecting a carrier connection with said at least one remote location;

said transmission means includes means for repeatedly reaccessing said telecommunication system when no carrier connection is detected with any of said predetermined at least one remote location;

wherein said transmission means includes stop means for terminating accessing after a predetermined power loss condition until primary source power is restored for a predetermined time, and storage means for maintaining generated communications until they are transmitted to each said predetermined at least one remote location.

8. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for maintaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to each of a predetermined at least one remote location upon detecting a modem carrier connection with each of said predetermined at least one remote location; and said monitoring means includes means for sampling the switch conditions after each accessing attempt.

9. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for maintaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to each of a predetermined at least one remote location upon detecting a modem carrier connection with each of said predetermined at least one remote location; and said report assembly means includes means for generating a cumulative communication of each switch condition change occurring since the last communication transmission.

10. An automatic microprocessor controlled remote monitoring device comprising:

a plurality of switches, monitoring means for comparing a predetermined condition of each switch with the actual condition of each of the plurality of switches and generating a data signal responsive to each change of condition of any said switch;

non-volatile memory means for maintaining control data including an identification of the switch changed, the identification of the location of the monitoring device, condition data for each of said switches, and said predetermined condition of each switch;

report assembly means for generating a communication reporting each said data signal and said control data related to said changed switch condition, transmission means for automatically accessing a telecommunication system and transmitting said communication to each of a predetermined at least one remote location upon detecting a modem carrier connection with each of said predetermined at least one remote location;

said transmission means includes means for repeatedly reaccessing said telecommunication system when no carrier connection is detected with any of said predetermined at least one remote location; and wherein said transmission means includes stop means for terminating accessing after a predetermined power loss condition until primary source power is restored for a predetermined time, and storage means for maintaining generated communications until they are transmitted to each said predetermined at least one remote location.

11. A method for indicating an alarm condition in any of a plurality of relay switches at an originating site to a remote location coupled to the originating site by a telecommunication network, the method comprising:

monitoring said switches for a change of condition;

storing stored data in memory including a reference condition for each said switch and a predetermined condition for each switch, comparing the changed condition of any said switch with said predetermined condition of said switch;

generating a data signal responsive to said change of condition;

assembly a report including said data signal and selected stored data selected in response to said data signal;

automatically accessing the telecommunication network;

transmitting the assembled report to said remote location upon detecting a carrier connection with said remote location; and further comprising sensing an error in the integrity of said stored data, and reprogramming said stored data in memory in response to said error.

* * * * *

UNITED STATES PATENT AND TRADEMARK OFFICE
CERTIFICATE OF CORRECTION

PATENT NO.   :   5,136,281
DATED        :   August 4, 1992
INVENTOR(S)  :   James P. Bonaquist It is certified that error appears in the above-identified patent and that said Letters Patent is hereby corrected as shown below:

Column 1, line 26, after "environments" insert -- . --.
Column 1, line 64, after "networks" insert -- . --.
Column 1, line 68, after "additional" insert -- alarm --.
Column 2, line 30, after "relays" insert -- , --.
Column 2, line 68, after "back-up" insert -- power --.
Column 3, line 37, "the" should read -- The --.
Column 5, line 18, after "back-up" insert -- . --.
Column 5, line 42, "showon" should read -- shown --.
Column 7, line 40, after "is" delete -- . --.
Column 9, line 49, "ad usted" should read -- adjusted --.
Column 10, line 14, claim 1, "reacessing" should read -- reaccessing --.
Column 10, line 21, claim 1, "attempts" should read -- attempt --.
Column 10, line 21, claim 1, "'wherein" should read -- wherein --.
Column 10, line 22, claim 1, "communications" should read -- communication --.
Column 10, line 57, claim 3, "teh" should read -- the --.
Column 12, line 3, claim 6, "manitaining" should read -- maintaining --.
Column 12, line 61, claim 7, "loww" should read -- loss --.
Column 14, line 50, claim 11, "assembly" should read -- assembling --.

Signed and Sealed this

Twenty-second Day of February, 1994

Attest:

BRUCE LEHMAN

*Attesting Officer*   *Commissioner of Patents and Trademarks*